United States Patent
Blake et al.

(10) Patent No.: US 6,732,983 B1
(45) Date of Patent: May 11, 2004

(54) CABLE CLIP

(76) Inventors: Joshua Blake, 5600 NW. 12th Ave., Suite 306, Ft. Lauderdale, FL (US) 33309; Jason Cohen, 5600 NW. 12th Ave., Suite 306, Ft. Lauderdale, FL (US) 33309

( * ) Notice: Subject to any disclaimer, the term of this patent is extended or adjusted under 35 U.S.C. 154(b) by 0 days.

(21) Appl. No.: 10/374,029

(22) Filed: Feb. 25, 2003

(51) Int. Cl.[7] ............................................. F16L 3/08
(52) U.S. Cl. ................................................... 248/74.2
(58) Field of Search ....................... 248/74.2, 71, 74.5, 248/73; 24/543, 569, 535

(56) References Cited

U.S. PATENT DOCUMENTS

| | | | |
|---|---|---|---|
| 3,906,592 A | * 9/1975 | Sakasegawa et al. | 248/68.1 |
| 4,265,420 A | 5/1981 | McCormick | |
| D270,329 S | 8/1983 | Hardy | |
| 4,637,097 A | 1/1987 | Secord | |
| D302,655 S | 8/1989 | Sachs | |
| 4,903,920 A | 2/1990 | Merritt | |
| D308,819 S | 6/1990 | Anscher | |
| D329,373 S | 9/1992 | Kaga | |
| D331,358 S | 12/1992 | Sachs | |
| 5,201,484 A | * 4/1993 | Thoen | 248/68.1 |
| D342,013 S | 12/1993 | Sachs | |
| D349,038 S | 7/1994 | Sachs | |
| 5,363,539 A | * 11/1994 | Tisol | 24/543 |
| 5,411,228 A | 5/1995 | Morawa | |
| 5,482,234 A | * 1/1996 | Lyon | 248/74.5 |
| 5,535,969 A | * 7/1996 | Duffy, Jr. | 248/68.1 |
| 5,615,852 A | 4/1997 | Heidorn | |
| 5,639,049 A | 6/1997 | Jennings | |
| D389,732 S | 1/1998 | Weishaar | |
| 5,739,474 A | 4/1998 | Bradley | |
| D398,218 S | 9/1998 | Coll | |
| D400,090 S | 10/1998 | Coll | |
| 5,815,894 A | * 10/1998 | Soriano | 24/510 |
| 6,010,100 A | 1/2000 | Merritt | |
| 6,011,218 A | * 1/2000 | Burek et al. | 174/40 CC |
| 6,021,982 A | 2/2000 | Mangone, Jr. | |
| D428,330 S | 7/2000 | Johnston | |
| 6,243,928 B1 | 6/2001 | Powell | |
| 6,257,920 B1 | 7/2001 | Finona | |
| 6,279,208 B1 | 8/2001 | Gillis | |
| 6,378,814 B1 | 4/2002 | Kaplan | |
| 6,398,170 B1 | * 6/2002 | Wada | 248/74.5 |
| 6,561,465 B2 | * 5/2003 | Kondo | 248/74.3 |
| 2001/0054671 A1 | * 12/2001 | Kondo | 248/74.3 |
| 2002/0000027 A1 | * 1/2002 | Andersen et al. | 24/535 |
| 2003/0115726 A1 | * 6/2003 | Liao | 24/569 |

FOREIGN PATENT DOCUMENTS

WO    WO 97/40305    * 10/1997

* cited by examiner

*Primary Examiner*—Ramon O. Ramirez
*Assistant Examiner*—Kofi Schulterbrandt
(74) *Attorney, Agent, or Firm*—Mark D. Bowen, Esq.; Stearns Weaver Miller Weissler Alhadeff & Sitterson, P.A.

(57) ABSTRACT

A cable clip having a locking jaw structure capable of securing a coaxial cable for subsequent mounting to a surface is disclosed. The cable clip is formed with upper and lower jaw portions defining a cable-retaining opening adapted for receiving at least one cable therein. The jaw portions are connected so as to be generally configurable between an open configuration wherein at least one cable may be insertably received, and a closed configuration wherein the cable is received and secured within the clip body. An automatically engaging locking mechanism and interlocking teeth on the upper and lower jaw portions provide for the alignment of the jaws and securing of the cable prior to mounting. The upper and lower jaw portions each define a fastener-receiving aperture for securing the clip (and cable) to a mounting surface.

6 Claims, 5 Drawing Sheets

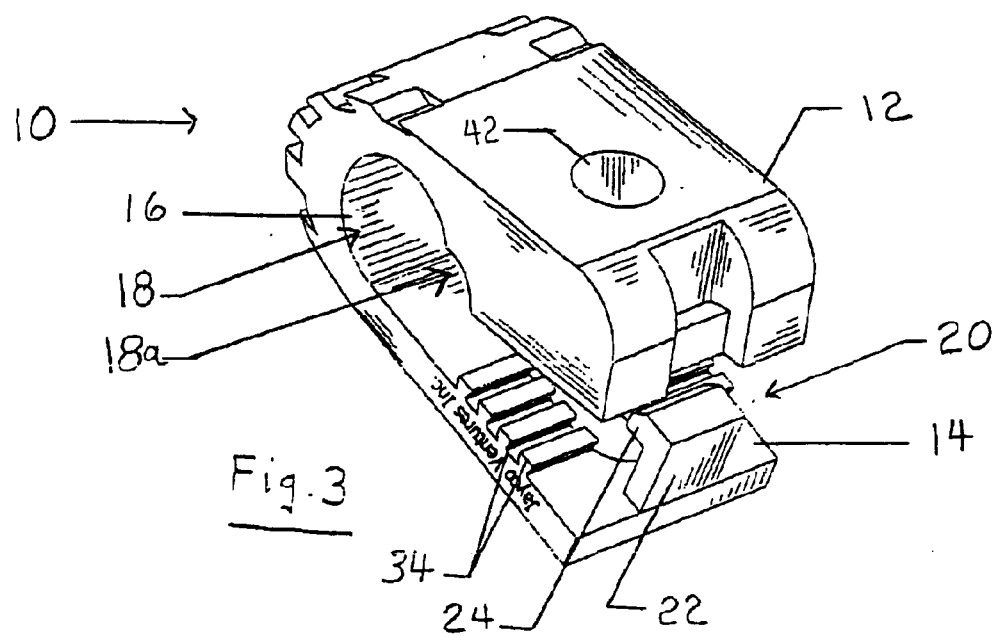
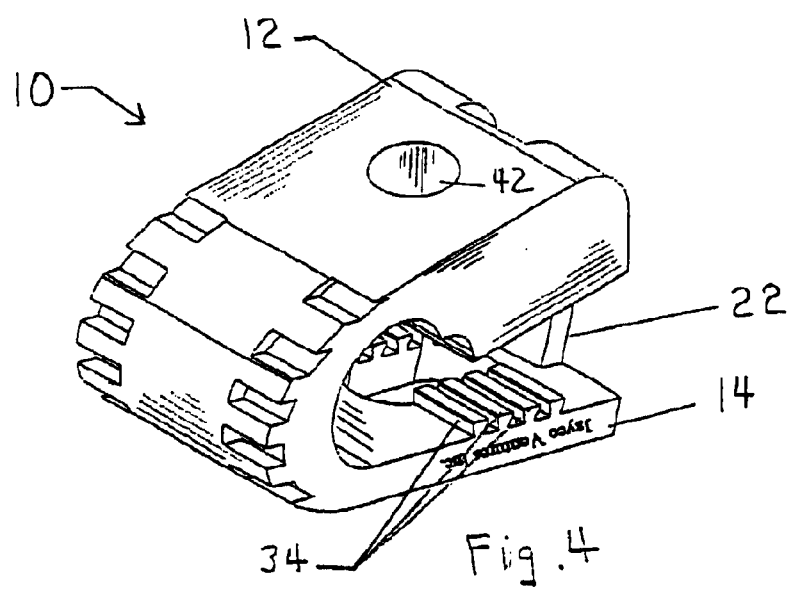

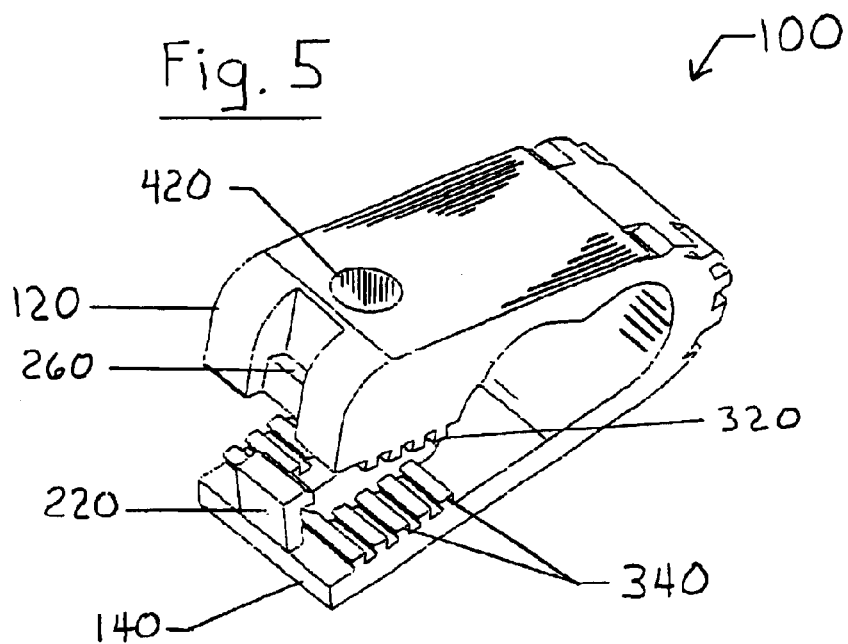
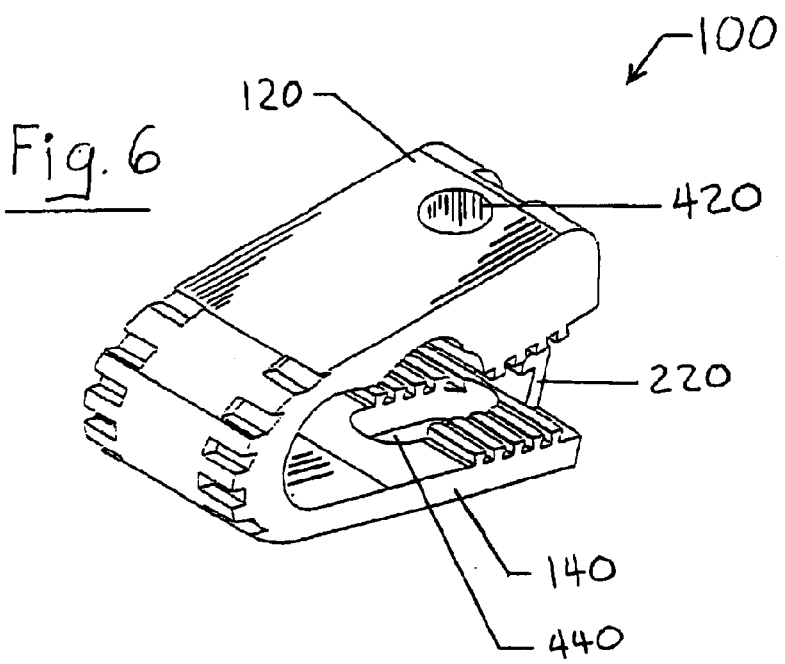

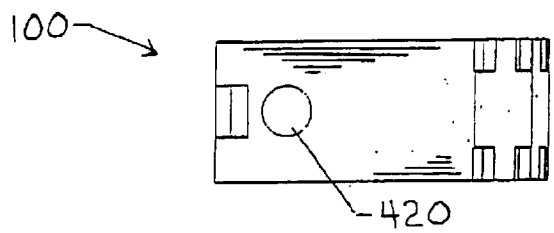
Fig. 9
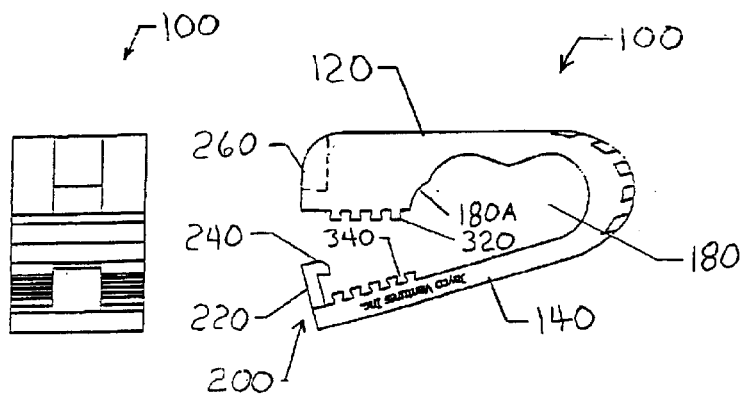 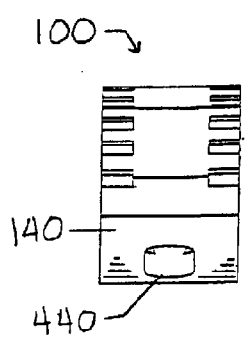
Fig. 10  Fig. 11  Fig. 12
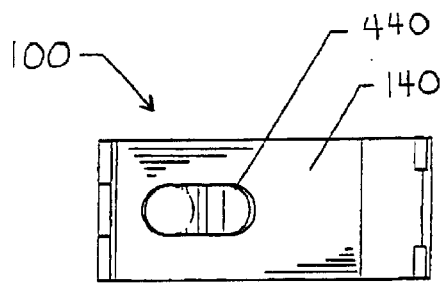
Fig. 13

CABLE CLIP

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure, as it appears in the Patent and Trademark Office patent file or records, but otherwise reserves all copyrights.

BACKGROUND OF THE INVENTION

1. Field of the Invention

The present invention relates to clips for use in securing coaxial cables and wires to a mounting surface, such as a floor, wall, or ceiling, using a mechanical fastener.

2. Description of the Background Art

The use of clips for securing cables to a mounting surface is known in the art. Cable clips are often used to secure TV, electrical wiring, or computer cables to a mounting surface such as a floor, interior and exterior walls, ceiling, or any other suitable mounting structure. The clip is often attached by a mechanical fastener, such as a nail or screw, driven into the mounting surface through an aperture formed in the clip.

A wide variety of cable clips designs are disclosed in the background art. For example, U.S. Pat. No. Des. 331,358, issued to Sachs, discloses a cable clip having an arcuate portion for securing a cable and a trapezoidal section connected thereto defining an aperture for receiving a fastener. U.S. Pat. Nos. Des. 342,013 and Des. 349,038, also issued to Sachs, discloses alternate configurations for a cable clip. U.S. Pat. No. 6,010,100, issued to Merritt, discloses a cable clip assembly defining an inverted U-shaped portion sized for receipt of a single cable, and a body portion adapted for being penetrated by a threaded fastener. U.S. Pat. No. 5,739,474, issued to Bradley, discloses a cable clip assembly having a cable-receiving portion with a plurality of longitudinal grooves that allow a portion of the clip to deform in a crimping action to secure the cable.

While the devices disclosed in the background art appear adequate for the basic purposes for which they have been specifically designed, they fail to provide a cable clip adapted for securing both TV and ground wire or messenger wire in a locked configuration for subsequent fastening to a mounting surface. As a result of the shortcomings of the background art, there has exists a need for a new and improved cable clip.

BRIEF SUMMARY OF THE INVENTION

The present invention overcomes the shortcomings and disadvantages in the art by providing a cable clip having a locking jaw structure capable of securing a coaxial cable for subsequent mounting to a surface. A cable clip according to the present invention is fabricated in the form of a plastic clip having upper and lower jaw portions having a cable-retaining opening defined by interior surface adapted for receiving at least one cable therein. The jaw portions are connected so as to be generally positionable between an open configuration wherein at least one cable may be insertably received, and a closed configuration wherein the cable is secured within the clip body. An automatically engaging locking mechanism and interlocking teeth on the upper and lower jaw portions provide for the alignment of the jaws and securing of the cable prior to mounting. The upper and lower jaw portions each define a fastener-receiving aperture for securing the clip (and cable) to a mounting surface.

During installation, the cable(s) to be retained is placed in the cable-retaining opening while the clip jaws are disposed in the open configuration and secured by closure of the clip jaws, which are secured in the closed configuration by the automatically engaging locking mechanism. The cable is then secured to a mounting surface by insertion of a mechanical fastener, such as a nail or screw, through the fastener receiving apertures.

Accordingly, it is an object of the present invention to provide an improved cable clip.

Still another object of the present invention is to provide a cable clip having locking upper and lower jaws.

Yet another object of the present invention is to provide a cable clip having upper and lower jaws with projecting teeth for alignment of the jaws in a locked configuration.

A further object of the present invention is to provide an improved locking clip capable of simultaneously securing multiple cables.

Still further objects and advantages will become apparent from a consideration of the ensuing description and drawings.

BRIEF DESCRIPTION OF THE SEVERAL VIEWS OF THE DRAWINGS

For a more complete understanding of the present invention, reference should be made to the following detailed description and the accompanying drawings in which:

FIG. 3 is a front right perspective view thereof;

FIG. 4 is a rear right perspective view thereof;

FIG. 5 is a front left perspective view of an alternate embodiment, dual cable clip according to the present invention;

FIG. 6 is a rear left perspective view thereof;

FIG. 9 is a top view of an alternate dual cable embodiment;

FIG. 10 is a front view thereof;

FIG. 11 is a side elevational view thereof;

FIG. 12 is a rear view thereof; and

FIG. 13 is a bottom view thereof.

DETAILED DESCRIPTION OF THE INVENTION

Figure 1:
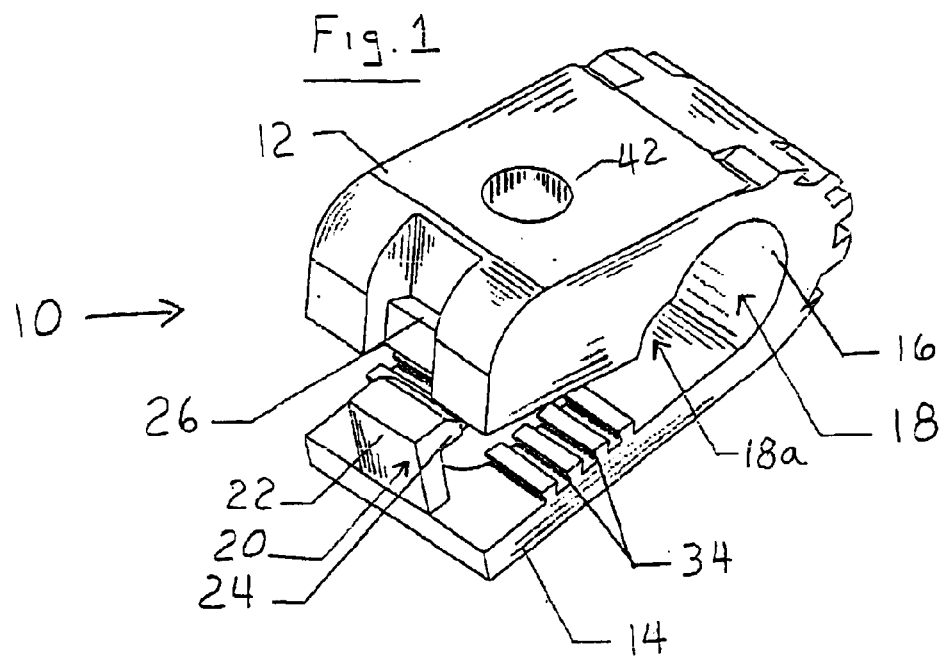
FIG. 1 is a front left perspective view of a cable clip according to the present invention.
Figure 2:
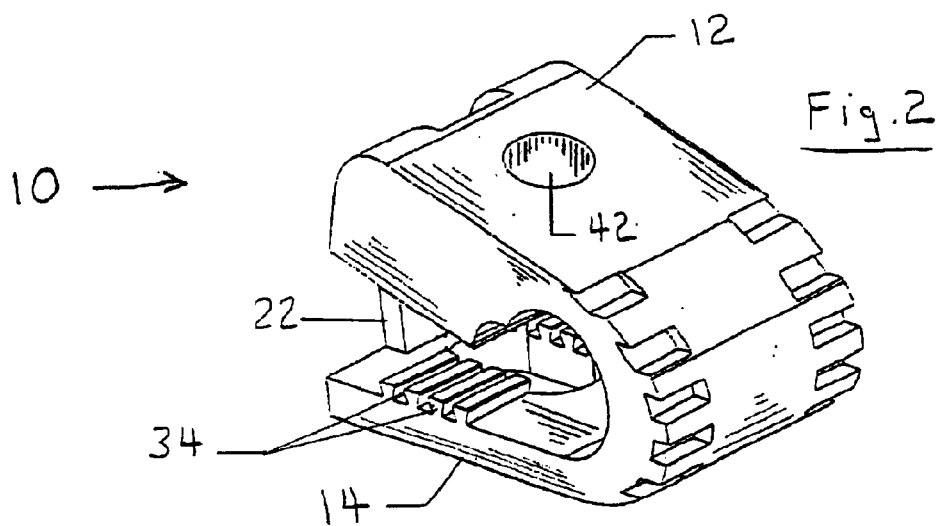
FIG. 2 is a rear left perspective view thereof.

FIGS. 1–4 depict a cable clip, generally referenced as 10, having a locking jaw structure capable of securing a coaxial cable for subsequent mounting to a surface according to the present invention. Cable clip 10 is preferably fabricated in the form of a plastic clip and defines upper and lower jaw portions, referenced as 12 and 14 respectively. Clip 10 has an interior surface 16 forming a cable-retaining opening 18 adapted for receiving and securing at least one cable therein. Jaw portions 12 and 14 are connected so as to be generally positionable between an open configuration wherein at least one cable may be insertably received within cable-retaining opening 18, and a closed configuration wherein the cable is secured within opening 18. In a preferred embodiment, interior surface 16 defines a cable-retaining opening 18 having a generally circular cross-section sized for receiving a coaxial cable and further defining an arcuate recessed notch 18a sized for receiving a smaller cable, such as a ground wire, messenger cable, or telephone cable adjacent to the coaxial cable.

Cable clip 10 further includes a manual locking mechanism, generally referenced as 20, that automatically engages upon closure of jaw portions 12 and 14. More particularly, lower jaw portion 14 defines a front peripheral edge 14a having an upwardly projecting post member 22 terminating in an inwardly projecting flange 24 having a beveled upper edge. Upper jaw portion 12 defines a front peripheral edge 12a having a recessed lip 26 which provides a structure for interlocking engagement with projecting member 22 and flange 24. When in use, the closure of jaws 12 and 14 results in contact between the beveled upper edge of flange 24 with the lower edge of lip 26 thereby urging projecting member outward by cam induced movement. As should be apparent, complete closure of jaws 12 and 14 results in interlocking engagement of flange 24 and lip 26.

A further significant aspect of the present invention involves the provision of interlocking teeth, referenced as 32 and 34, on upper and lower jaw portions 12 and 14 which provide for the alignment of the jaws. More particularly, upper jaw portion 12 defines a plurality of downwardly projecting teeth 32 and lower jaw portion 14 defines a plurality of upwardly projecting teeth 34 disposed for interlocking engagement upon closure of jaw portions 12 and 14. Interlocking teeth 32 and 34 function to maintain upper and lower jaw portions properly aligned with respect to one another so as to insure adequate locking. The ability to lock the clip onto the cable prior to mounting the cable to the mounting surface reduces the time required to install the cable.

Finally, upper and lower jaw portions 12 and 14 each define a fastener-receiving aperture, referenced as 42 and 44 respectively, for securing the clip (and cable) to a mounting surface. In a preferred embodiment, aperture 42 is generally circular and sized for receiving a mechanical fastener, such as a nail or screw. Aperture 44 is preferably elongated or slotted to allow for a degree of freedom for adjustment.

During installation, a coaxial cable is retained is placement in cable-retaining opening 18 while clip jaws 12 and 14 are disposed in the open configuration and secured by closure of the clip jaws. In addition, a second cable, such as a ground wire or messenger wire, may also be retained by placement in the secondary cable-retaining opening 18a adjacent to the coaxial cable and secured by closure of the clip jaws. Closure of clip jaws 12 and 14 results in automatic cam-type activation of the locking structure 20 thereby securing the jaws in a closed configuration with the cables secured therein. The cables may then be secured to a mounting surface by insertion of a mechanical fastener (not shown), such as a nail or screw, through the fastener receiving apertures.

Figure 7:
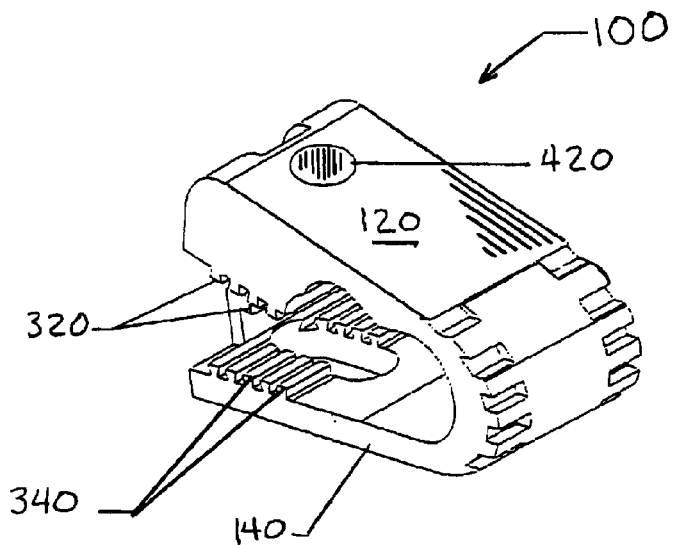
FIG. 7 is a front right perspective view thereof.
Figure 8:
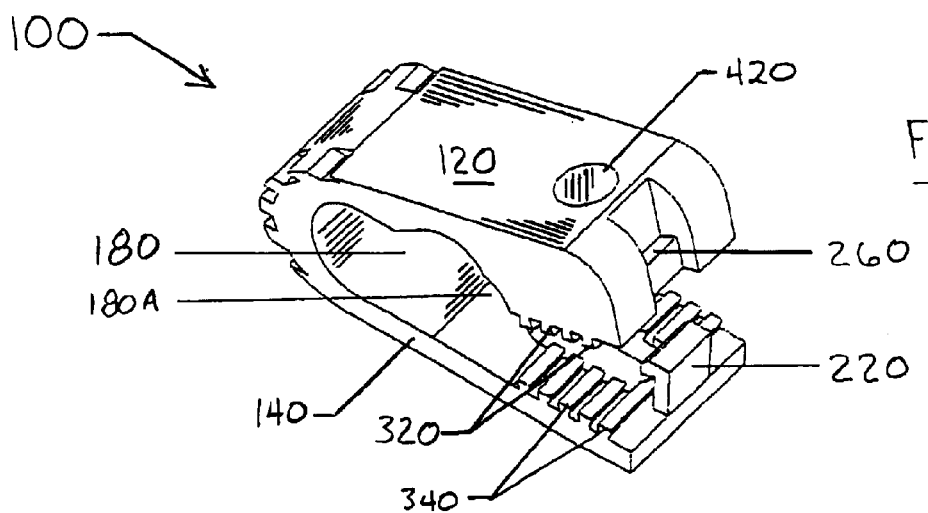
FIG. 8 is a rear right perspective view thereof.

FIGS. 5–13 depict an alternate embodiment clip, generally referenced as 100, adapted for simultaneously retaining two coaxial cables, and a ground or messenger wire. Cable clip 100 includes upper and lower jaw portions, referenced as 120 and 140 respectively. Clip 100 has an interior surface forming a cable-retaining opening 180 adapted for receiving and securing two coaxial cables and a ground wire or messenger wire therein. Upper and lower jaws 120 and 140 are connected so as to be generally positonable between an open configuration wherein two coaxial cables may be insertably received within cable-retaining opening 180 in side-by-side relation, and a closed configuration wherein the cables are secured within opening 180. In a preferred embodiment, the interior surface defines a cable-retaining opening 180 defined by an interior wall having generally arcuate portions sized and shaped for receiving two coaxial cables, and further defining an arcuate recessed notch 180A sized for receiving a smaller cable, such as a ground wire, messenger cable, or telephone cable adjacent to the coaxial cable.

Cable clip 100 further includes a manual locking mechanism, generally referenced as 200, that automatically engages upon closure of jaw portions 120 and 140. More particularly, lower jaw portion 140 defines a front peripheral edge having an upwardly projecting post member 220 terminating in an inwardly projecting flange 240 having a beveled upper edge. Upper jaw portion 12 defines a front peripheral edge defining a recessed lip 260 that provides a structure for interlocking engagement with projecting member 220 and flange 240. When in use, the closure of jaws 120 and 140 results in contact between the upper beveled edge of flange 240 with the lower edge of lip 260 thereby urging projecting member outward by cam induced movement. As should be apparent, complete closure of jaws 120 and 140 results in interlocking engagement of flange 240 and lip 260.

A further significant aspect of the present invention involves the provision of interlocking teeth, referenced as 320 and 340, on upper and lower jaw portions 120 and 140 which provide for the alignment of the clip jaws. More particularly, upper jaw portion 120 defines a plurality of downwardly projecting teeth 320 and lower jaw portion 140 defines a plurality of upwardly projecting teeth 340 disposed for interlocking engagement upon closure of jaws 120 and 140. Interlocking teeth 320 and 340 function to maintain upper and lower jaw portions properly aligned with respect to one another so as to insure adequate locking prior to anchoring the clip to a mounting surface.

Finally, upper and lower jaw portions 12 and 14 each define a fastener-receiving aperture, referenced as 420 and 440 respectively, for securing the clip (and cable) to a mounting surface. In a preferred embodiment, aperture 420 is generally circular and sized for receiving a mechanical fastener, such as a nail or screw. Aperture 440 is preferably elongated or slotted to allow for a degree of freedom for adjustment.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What we claim is:

1. A cable clip for retaining a cable against a mounting surface, said cable clip comprising:
   a clip body having upper and lower jaws, said clip body further defining a cable retaining aperture for retaining at least one cable, said jaws configurable between open and a closed configurations;

said upper jaw defining a first fastener-receiving aperture;

said lower jaw defining a second fastener-receiving aperture;

a plurality of teeth protecting from said upper and lower jaws, said teeth configured to interlock such that said upper jaw is prevented from moving longitudinally rearward relative to said lower jaw;

means for locking said upper and lower jaws in said closed configuration.

2. A cable clip according to claim 1, wherein said means for locking said upper and lower jaws comprises a post member projecting upwardly from said lower jaw and a lip defined by said upper jaw, said post member engaging said lip in said closed configuration.

3. A cable clip for retaining a cable against a mounting surface, said cable clip comprising:

a clip body having hingedly connected upper and lower jaws defining a cable retaining aperture therebetween for retaining at least one cable, said jaws configurable between open and a closed configurations;

said upper jaw defining an upper fastener-receiving aperture;

said lower jaw defining a lower fastener-receiving aperture;

said upper and lower jaws each including a plurality of teeth disposed for interlocking aligned engagement when said upper and lower jaws are in said closed configuration such that said upper jaw is fixed longitudinally relative to said lower jaw such that said upper jaw is prevented from moving longitudinally forward and rearward relative to said lower jaw; and means for locking said upper and lower jaws in said closed configuration.

4. A cable clip according to claim 3, wherein said means for locking said upper and lower jaws in said closed configuration includes one of said jaws including a projecting post member having a beveled surface and the other of said jaws having a lip, whereby closure of said jaws results in engagement of said beveled surface with said lip thereby urging said post member into position for locking engagement with said lip.

5. A cable clip according to claim 3, wherein said upper fastener receiving aperture is a generally circular aperture and said lower fastener receiving aperture is an elongate slotted aperture.

6. A cable clip according to claim 3, wherein said cable retaining aperture for retaining at least one cable includes first and second portions adapted for receiving two coaxial cables in substantially adjacent, side-by-side relation and a third portion adapted for receiving a wire.

* * * * *